United States Patent
Creamer et al.

(10) Patent No.: US 6,731,732 B2
(45) Date of Patent: May 4, 2004

(54) METHOD AND APPARATUS FOR CALENDAR BASED CALL CONTROL

(75) Inventors: Thomas E. Creamer, Boca Raton, FL (US); Zygmunt A. Lozinski, Winchester (GB); Victor S. Moore, Boynton Beach, FL (US); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 09/946,226

(22) Filed: Sep. 5, 2001

(65) Prior Publication Data

US 2003/0043986 A1 Mar. 6, 2003

(51) Int. Cl.[7] .................. H04M 3/42; H04M 3/432; H04M 3/436; G06F 9/44; G06F 15/16
(52) U.S. Cl. .................. 379/201.03; 379/207.03; 379/196; 379/207.15; 345/963; 370/259; 709/217; 709/246; 717/114
(58) Field of Search .................. 345/963; 370/259; 379/201.01, 201.02, 201.03, 207.03, 900, 207.15, 196, 197, 198; 709/217, 218, 219, 246; 717/114

(56) References Cited

U.S. PATENT DOCUMENTS

| | | | |
|---|---|---|---|
| 5,428,678 A | * | 6/1995 | Fitzpatrick et al. ..... 379/201.02 |
| 5,493,692 A | * | 2/1996 | Theimer et al. ........... 455/26.1 |
| 5,872,841 A | * | 2/1999 | King et al. ............ 379/210.01 |
| 5,960,406 A | * | 9/1999 | Rasansky et al. ............... 705/9 |
| 6,016,478 A | * | 1/2000 | Zhang et al. ................... 705/9 |
| 6,064,977 A | * | 5/2000 | Haverstock et al. ........... 705/9 |
| 6,065,012 A | * | 5/2000 | Balsara et al. .............. 707/102 |
| 6,275,575 B1 | * | 8/2001 | Wu ........................ 379/202.01 |
| 6,301,621 B1 | * | 10/2001 | Haverstock et al. ........ 709/246 |
| 6,373,817 B1 | * | 4/2002 | Kung et al. ................. 370/217 |
| 6,477,374 B1 | * | 11/2002 | Shaffer et al. .............. 455/445 |
| 6,601,016 B1 | * | 7/2003 | Brown et al. ................ 702/182 |
| 2002/0147004 A1 | * | 10/2002 | Ashmore ..................... 455/414 |

OTHER PUBLICATIONS

"Method for Automatic Conference Calling by Caledar Event", IBM Technical Disclosure Bulletin, vol. 37, No. 1, Jan. 1, 1994, New York, USA, p. 679.*
"Calendar Scheduling Teleconference Communication Mechanism", IBM Technical Disclosure Bulletin, vol. 37, No. 3, Mar. 1, 1994, New York, USA, p. 561.*
"Method for Integration of Telephony Services. . . ", Jul. 10, 1999, Derwent.*

* cited by examiner

Primary Examiner—Harry S. Hong
(74) Attorney, Agent, or Firm—Akerman Senterfitt

(57) ABSTRACT

The invention provides a method and apparatus for an extensible markup language (XML) calendar-telephony interface. The method can include the steps of defining an markup language element having a user defined tag that represents a calendar entry. The markup language element can have attributes which can represent call control instructions or information. The attributes can also be formatted using a markup language format that utilizes user defined tags. The elements and/or attributes can be formatted using XML format. The call control instruction can be provided to a telephony application upon initiation of a call or by request. A calendar application program can be used for maintaining calendar entries which can be stored in a database and made accessible to the telephony call control application. Utilizing call rejection as an illustration, a called party can have an XML formatted calendar entry stored which indicates that no calls are to be received from callers during a specified period except calls from a caller having a particular DN. If a call is initiated by a caller having that particular DN during the specified time period, the telephony application can determine that the call should be allowed. Accordingly, a network signaling device can be instructed to route the call to the dialed DN. If the calling DN was different from the particular DN stored in the XML calendar database, the call would not be completed.

34 Claims, 3 Drawing Sheets

METHOD AND APPARATUS FOR CALENDAR BASED CALL CONTROL

BACKGROUND OF THE INVENTION

1. Technical Field

The present invention relates to the field of data formatting using markup languages, and more particularly, to a method and apparatus for calendar based call control.

2. Description of the Related Art

The development of the extensible markup language (XML) has provided great flexibility for formatting data for presentation in an interface such as a browser. XML acts as a framework for the structured representation of data and is superior to existing markup languages such as hypertext markup language (HTML). HTML on a high level is essentially a protocol for defining the appearance of text through the use of predefined tags. On the other hand, XML utilizes user-defined tags to define the structure and content of data. Notably, XML allows presentation of formatted data to be independently handled. XML's superiority can be attributed to its ability to separate form from content and also its capability to easily define the structure and content of any data.

Significant to the development of XML is the development of the open network application programming interface (API) in the area of telephony. In order to remain competitive, future integrated telephone networks will have to offer application developers a set of standard, open APIs so that applications written for compatibility with one vendor's system can execute in another vendor's system. In consequence, the cost of applications development can be amortized, reducing the final cost to the customer. Java APIs for Integrated Networks (JAIN) fulfills the requirements of the new open API in the area of telephony. Presently, JAIN includes standard, open published Java APIs for next-generation telephony systems consisting of integrated Internet Protocol (IP) networks, asynchronous transport mode (ATM) networks, PSTN, and wireless networks. The JAIN APIs include interfaces at the protocol level, for different protocols such as Media Gateway Control Protocol (MGCP), Session Initiation Protocol (SIP), and Transactional Capabilities Application Part (TCAP), as well as protocols residing in the higher layers of the telecommunications protocol stack.

JAIN includes a set of integrated network APIs for the Java platform and an environment to build and integrate JAIN components into services or applications that work across PSTN, packet and wireless networks. The JAIN approach integrates wireline, wireless, and packet-based networks by separating service-based logic from network-based logic. FIG. 1 illustrates a conventional JAIN implementation. As shown in FIG. 1, a conventional JAIN implementation can include a protocol layer 102 which can include interfaces to IP, wireline and wireless signaling protocols. Though TCAP (110B) and H.323 (110C) protocols 110 are shown, the protocols supported by the JAIN specification are not limited to those particular protocols and can include, for example, TCAP, ISUP, INAP, MAP, SIP, MGCP, and H.323. Moreover, the JAIN implementation can include an interface to a connectivity management and call control protocol such as JCC110A.

In addition to the protocol layer 102, the conventional JAIN implementation can also include an application layer 104 for handling secure network access and other external services 120. Also, the conventional JAIN implementation can include a service logic layer (service layer) 106 which can include a service creation and carrier grade service logic execution environment (SLEE) 108. Service components 112 are the core JAIN components and can execute in the SLEE 108. More particularly, service components 112 can implement telephony and network services and can be constructed according to a standard component model. Instantiations of service component assemblies execute in coordination with the SLEE 108.

In operation, using information regarding the protocol layer 102 which can be incorporated into the SLEE 108, service components 112 can interact with an underlying protocol stack 110 without having specific knowledge of the protocol stack 110. More importantly, the SLEE 108 can relieve the service components 112 of conventional lifecycle responsibilities by providing portable support for transactions, persistence, load balancing, security, and object and connection instance pooling. In this way, the service components 112 can focus on providing telephony and/or network services. Notably, the SLEE 108 can be communicatively linked directly to client components such as external applications 116, protocol stacks 110 and service components 112.

For example, service components 112 executing at the service logic layer 106 in the SLEE 108 can communicate with protocol stacks 110 in the protocol layer through protocol adapters in the SLEE 108. Protocol adapters typically can include class methods, callbacks, encapsulating interfaces, or event handlers. In many cases, an underlying protocol stack 110 can directly communicate with the SLEE 108 through an event table 114 in the SLEE 108 which can be configured to specifically handle events which are particular to the underlying protocol stack 110. In consequence, the SLEE 108 can recognize those particular events, and upon receipt of such an event from the underlying protocol stack 110, the SLEE 108 can pass the event to a subscribing service component 112. Also, service components 112 can be individually programmed to interact with specific external services 120, such as relational databases and directory services.

Given the apparent advantages of JAIN with it's set of integrated API for the Java platform, the use of the XML with its structured representation of data can be used to further enhance the ability of advanced intelligent networks (AIN). In calendar based systems, it is often necessary to access telephony related activities. For example, a call could be forwarded to an alternate telephone number listed as a calendar entry. However, entries in existing calendar are usually in free-form text areas which make recognition and identification of the entries difficult, thereby making it impractical to have an existing calendar based call control entries. Hence, what is needed is a more flexible approach for providing calendar based call control.

SUMMARY OF THE INVENTION

The invention provides a method and apparatus for an extensible markup language (XML) calendar-telephony interface. The method for calendar based call control, can include the steps of defining an markup language element having a user defined tag that represents a calendar entry. The markup language element can have attributes which can represent call control instructions or information. The attributes can also be formatted using a markup language format that utilizes user defined tags. The call control instruction can be provided to a telephony application upon initiation of a call or by request. A calendar application program can be used for maintaining calendar entries which can be stored in a database and made accessible to the telephony call control application. The elements and/or attributes can be formatted using XML format.

The invention also discloses a method for providing calendar based call control. The method can include the steps of acquiring a called telephone number and a calling telephone number from a telephone network device for an associated telephone call. An identity of a party affiliated with the called telephone number can then be determined and call control information extracted from calendar entry associated with identified person. The calendar entry can be formatted using a markup language that does not have pre-defined tags. Here, the calendar entry can be formatted by utilizing user defined tags. The XML format can be used to format the calendar entries. The extracted control information can subsequently be used to control the disposition of the call. The extracting step can further include the steps of parsing the XML formatted calendar entry to determine a particular call control data in the entries, comparing the determined call control data with the calling telephone number and instructing the telephone network device to route the call to the called number in response to a match resulting from the comparison. The party can be a person, business or organization.

The method can further include the step of instructing the telephone network device to cancel the call to the called number if no match results from the comparison. An aural notification can be utilized to indicate the status of the call. The call control information can include a call rejection, a call forwarding, a call transfer, or call screen instruction. The telephone network device can include a switch, a signaling device, a routing device such as a bridge or router.

The invention also discloses a method for providing calendar based call control which can include the steps of acquiring a called telephone number for a telephone call originating from a calling telephone, providing the acquired telephone number to a telephony application, wherein the telephony application can acquire call control data from a calendar. Responsive to receiving call control data from the telephony application, routing the telephone call originating from the calling telephone based on the received call control data. The call control data can include call rejection data.

The invention further provides a method for calendar based call control which can include the steps of formatting data fields of a calendar entry in an XML format such that the data fields contain call control data. XML formatted call control data can be communicated to a telephony interface based on a call request, the telephony interface causing the XML formatted data to control handling of a telephony call feature.

The invention also discloses a machine readable storage having stored thereon, a computer program having a plurality of code sections, the code sections executable by a machine for causing the machine to perform the steps as previously described.

BRIEF DESCRIPTION OF THE DRAWINGS

There are presently shown in the drawings embodiments which are presently preferred, it being understood, however, that the invention is not so limited to the precise arrangements and instrumentalities shown, wherein.

DETAILED DESCRIPTION OF THE INVENTION

The present invention provides a method and apparatus for providing calendar based call control, wherein call control data can be recorded as entries in the calendar. A telephony call control application (telephony application) utilizing a JAIN API can be interfaced to a PSTN through a TCAP interface. In response to a call request initiated in the PSTN by a calling party, the telephony application can translate callerId (CID) information of a called directory number (DN) into a reference such as the called party's name or identity. The calling party's DN can also be determined. The telephony application can determine if the called party has any special call handling data for calls originating from the calling party's DN. This can be achieved by accessing a calendar application database which stores XML formatted call control data for the called party. If it is determined that a special handling instruction corresponding to the calling party's DN exists, the telephony application can extracted the pertinent call control data and provide it to a call routing device having, for example, a TCAP interface. It should be noted that the identity of the called party is not limited to a name or DN. Any identifier, including but not limited to, an IP address or a numeric or alphanumeric string can suffice.

As an illustration, the called party can have an XML formatted calendar application entry stored in an associated database which indicates that no calls are to be received from callers during a specified period except calls from a caller having a particular DN. If a call is initiated by a caller having that particular DN during the specified time period, the telephony application can determine that the call should be allowed. Accordingly, a message can be sent to a network signaling device via the TCAP interface to permit completion of the call. The signaling device can route the call to the dialed DN. If the calling DN was different from the particular DN stored in the XML calendar database, the call would not be completed.

Figure 1:
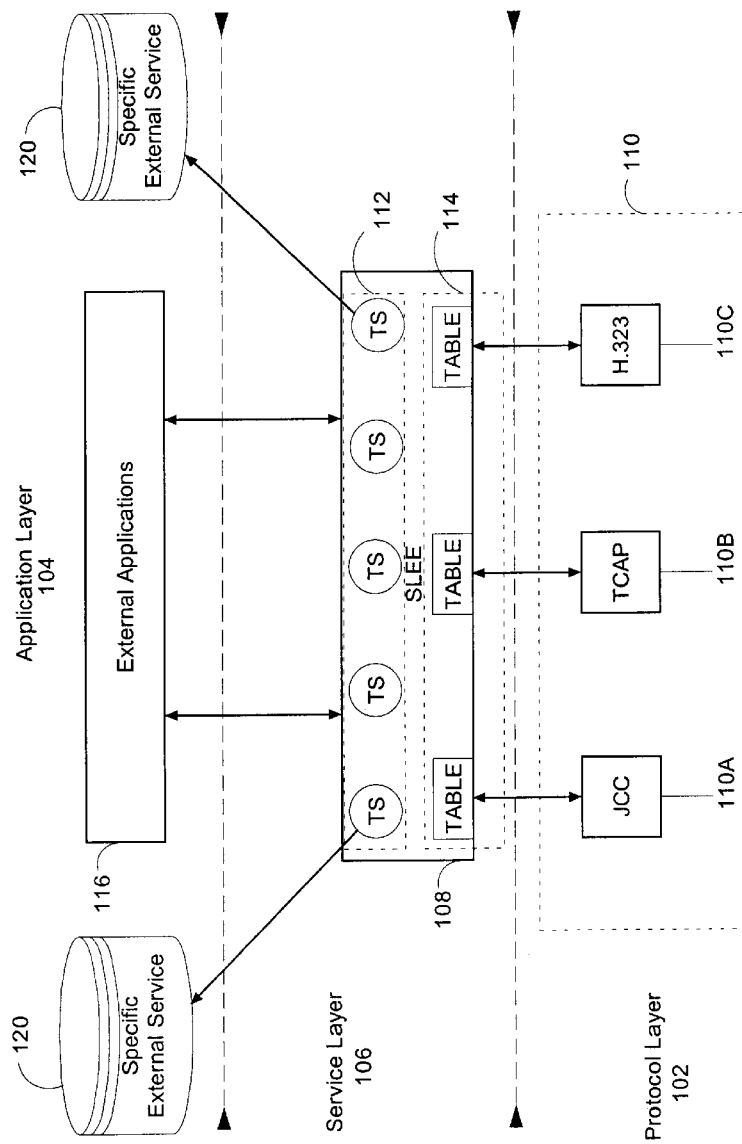
FIG. 1 is a schematic representation of an intelligent network architecture configured in accordance with a conventional JAIN implementation known in the art.
Figure 2:
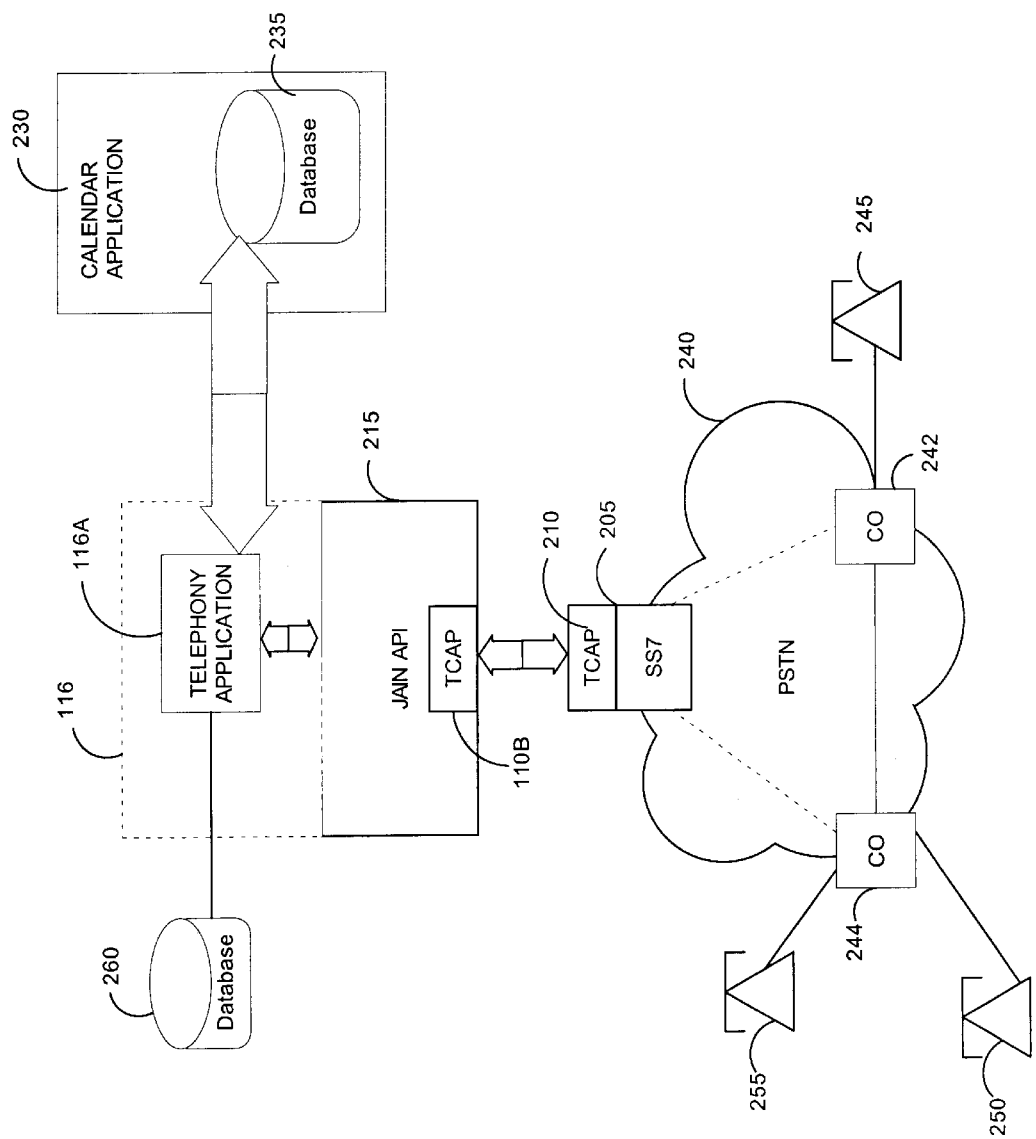
FIG. 2 is an exemplary system utilizing a calendar-telephony interface in accordance with the inventive aspects.

FIG. 2 is an exemplary system utilizing a calendar-telephony interface having a JAIN API as in FIG. 1. As shown in FIG. 2, PSTN 240 utilizes a SS7 signaling device 205 which has a TCAP interface 210. The SS7 signaling device 205 of PSTN 240 utilizes common channel signaling to handle call routing throughout the PSTN 240. SS7 is well known in the art of circuit switched telephony and the routing functions handled by SS7 interface include call management - set-up, maintenance and termination, and network management functions. In a typical call scenario, a call initiated by a calling party using telephone 245 and destined to a called party, for example telephone 255, can be set-up, maintained and terminated by the SS7 signaling device 205. Hence, all the signaling associated with the setting up and "tearing down" of the voice trunk can be handled by the SS7 signaling device 205. It should be recognized the use of SS7 is not intended to be a limitation on the system. Other call signaling and processing protocols can be utilized without departing from the spirit of the invention. Furthermore, the invention can also be applicable to an IP network or an IP/PSTN network.

TCAP interface 210 of SS7 signaling device 205 can provide connectivity to a platform with a JAIN API 215 having a corresponding TCAP interface 110B. TCAP interface 110B permits communication between external applications 116, for example, telephony application 116A, and signaling device 205 via the TCAP interface 210. Consequently, external applications 116 utilizing open APIs offered by JAIN can provide enhanced call services to the telephones 245, 250, 255 in PSTN 240.

The PSTN 240 provides local access service to telephones 245, 250, 255 via the central office (CO) 242, 244. Particularly, CO switch 242 provides local access service to telephone 245 and CO switch 244 provides local access service to telephones 255 and 250. In order to provide certain types of enhanced telephony services to the telephones 245, 250, 255 in PSTN 240, telephony application 116A can acquire data from an application, such as, a calendar application 230 which has an associated database 235. Call forwarding, call transfer, call screening, and call rejection are exemplary enhanced services and data associated with these services, which can be stored in database 235.

External applications 116, in particular telephony application program 116A, can be used to offer enhanced routing functions that can control the set-up, maintenance and termination of the call initiated by calling party using a telephone such as 245. External applications 116, for example telephony call control application 116A, can acquire information from a database of a calendar application 230. While the telephony application can acquire information from a calendar application database, it should readily be understood that the telephony application can alternately request the information from the calendar application.

Application calendar program 230 is an application program used to manage calendar entries which can be stored in a database 235. Calendar program 230 can facilitate tasks such as entering data that can be stored in an XML format in database 235. The calendar program 230 can facilitate other tasks, which can include routine database management functions such as viewing, deleting and updating records stored in database 235. The calendar application can be a separate calendar program or it can be part of a communication suite. Alternately, it can be an external device such as a PDA.

Figure 3:
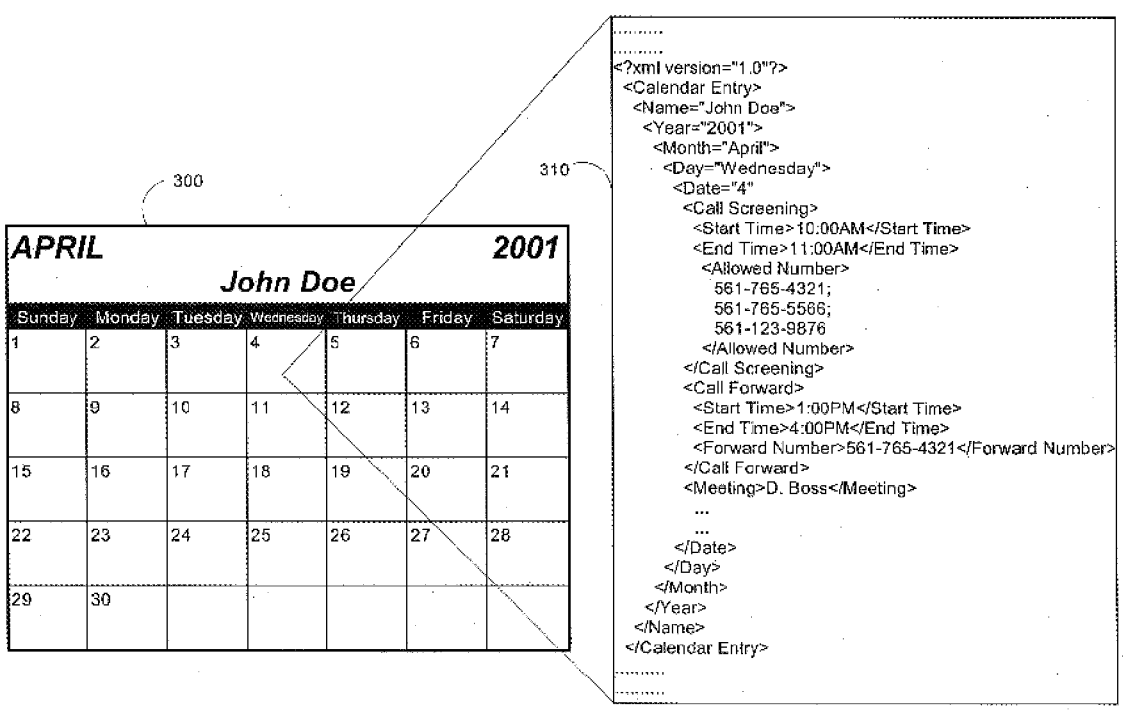
FIG. 3 shows an exemplary calendar having an XML formatted entry.

FIG. 3 shows an exemplary calendar having an entry formatted in XML. Calendar 300 contains personal calendar entries for John Doe. Sample XML formatted calendar entry 310 contains calendar information which has been formatted using XML format. Sample XML formatted calendar entry 310 contains data for Wednesday Apr. 4, 2001 for John Doe. The sample XML formatted calendar entry 310 indicates that no calls are to be allowed between 10:00 am and 11:00 am, except calls received from DNs 561-765-4321, 561-765-5566, and 561-123-9876. Furthermore, the sample XML formatted calendar entry 310 indicates that calls received between the hours of 1:00 pm and 4:00 pm are to be forwarded to 561-765-4321. Information of the sample XML formatted calendar entry 310 can be stored in database 235 and made accessible to calendar application program 230 and telephony application 116A. The sample XML formatted calendar entry 310 is not intended to be a limitation, and other exemplary entries can include, transferring an incoming call to a voice-mail or a secretary's DN or extension and placing a call on hold if the called DN is busy.

In accordance with the inventive aspects, a call can be placed by a calling party 245 to a called party 255 both serviced by the PSTN 240. Upon dialing the digits of the called party 255, the SS7 interface 205 must determine how the call should be routed. A determination of how to route the call can be made by communicating the dialed digits to the telephone application 116A through the common TCAP interfaces 210 and 110B respectively. Upon receipt of the dialed digits, the telephony application 116A can determine the identity of the called party 255 by searching for a name corresponding to the dialed digits in a name resolution database 260. The telephony application 116A can determine if a database 235 storing XML formatted call control data for the called party contains any special call handling data for the calling DN. If it is determined that there is call handling data for the calling DN, the call handling data can be communicated to the SS7 interface 205 through the TCAP interface 110B and 210. The SS7 interface can route the call accordingly.

For example, a subscriber using telephone 245 which has a DN of 561-123-9876 calls John Doe at telephone 255 which has a DN of 561-765-4455. CO switch 242 is the originating central office switch and CO switch 244 is the terminating central office switch. The name resolution database 260 has an entry corresponding to the DN of 561-765-4455 identified to the name John Doe. Prior to placing the call, the calling telephone 245 is on-hook. Upon being placed off-hook, a dial tone is provided by the originating CO switch 242 to the calling telephone 245. The dialed digits are sent to the SS7 signaling device 205. Telephony application 116A which communicates with the open JAIN API having a TCAP interface 110B, can capture the dialed digits through the common TCAP interface 210. Upon receiving the dialed digits, the telephone application 116A can look-up the name corresponding to the called number 561--765-4455 in the name resolution database 260. Based on the look-up, the name John Doe would correspond to the called number 561-765-4455 in the name resolution database.

Upon determination that John Doe is being called, the telephony application 116A can locate the database 235 containing XML formatted calendar information for John Doe. The XML formatted information can be parsed in order to determine if and how the call to John Doe should be routed. On parsing the XML formatted information 310 for John Doe, call routing information will be found. Specifically, if the call was received between 10:00 am and 11:00 am on Apr. 4th, 2001, then calls should be allowed only if the calling party's DN is 561-765-4321, 561-765-5566 or 561-765-9876. As a result, it will be determined that the call should be allowed since the calling DN is 561-123-9876. The telephony application 116A can send a "call-connect" TCAP message to the to the SS7 signaling device 205 via the TCAP interface 110B, 210. The SS7 signaling device 205 can send the called DN to the terminating CO switch 244. Terminating CO switch 244 alerts telephone 255 of the incoming call by sending telephone 255 a ringing signal. Simultaneously, a feedback signal is sent to the originating CO switch 242 which causes a ringing tone to be heard at the calling telephone 245. Upon the forwarded telephone 250 being placed off hook (call answered by a subscriber), the terminating CO switch 244 causes the ringing tone and the ringing signal to cease, and a voice trunk gets established between the originating CO switch 242 and the terminating CO switch 244. At this point, the calling telephone 245 and the called telephone 250 are now connected.

If the calling DN was not in the allowed XML listing as in the sample XML formatted entry 310, then it will be determined that the call should be not be allowed. The telephony application 116A can send a "call-release" TCAP message to the to the SS7 signaling device 205 via the TCAP interface 110B, 210. Instead of alerting telephone 255 of the incoming call, the SS7 signaling device 205 can send a signal to the originating CO switch 242 which causes, for example, a message indicating the call rejection status to be played.

It should be apparent that although the invention is described using call forwarding as the call routing instruction, other calling features may be utilized. These can include, but are not limited to, call screening, call rejection, call notification, call paging and call transfer. Moreover, it should be readily understood that although the foregoing description utilized a circuit switched system to illustrate the inventive arrangements, the invention is not so limited. In fact, the invention can be applicable to a packet switched network. For example, the SS7 signaling device 205 can be connected to a Media Gateway Controller (MEGACO) via a MTP2 interface. This allows packet switched data to be translated to circuit switched data and vice versa.

The present invention can be realized in hardware, software, or a combination of hardware and software. A method and apparatus for calendar based call control according to the present invention can be realized in a centralized fashion in one computer system, or in a distributed fashion where different elements are spread across several interconnected computer systems. Any kind of computer system, or other apparatus adapted for carrying out the methods described herein, is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method for providing calendar based call control, comprising:

defining a markup language element having a user defined tag representing a calendar entry having call control information; and representing data fields in the calendar entry as attributes within said markup language element, said attributes having user defined tags, said attributes representing a call control instruction.

2. The method according to claim 1, further comprising providing said call control instruction to a telephony application in response to initiation of a call.

3. The method according to claim 2, wherein the said calendar entry is stored in a database, said database comprising a calendar application program for maintaining said database.

4. The method according to claim 3, wherein said database is accessible by a telephony call control application.

5. The method according to claim 1, wherein said markup language element is an XML formatted element.

6. A method for providing calendar based call control, comprising:

acquiring a called telephone number and a calling telephone number from a telephone network device for an associated telephone call;

determining an identity of a party affiliated with said called telephone number;

extracting call control information from a markup language element having a user defined tag, said element representing a calendar entry associated with said identified party; and controlling a call based on said extracted call control information.

7. The method according to claim 6, wherein said extracting step further comprises:

parsing said calendar entry to determine a particular call control data in said entries;

comparing said determined call control data with said calling telephone number; and instructing said telephone network device to route said call to said called number in response to a match resulting from said comparison.

8. The method according to claim 7, further comprising, instructing said telephone network device to cancel said call to said called number in response to no match resulting from said comparison.

9. The method according to claim 8, further comprising, providing an aural notification pertaining to a call status.

10. The method according to claim 9, wherein said call control data is a call rejection instruction.

11. The method according to claim 7, wherein said telephone network device is a signaling device.

12. The method according to claim 7, wherein said telephone network device is a switch.

13. The method according to claim 6, wherein said party is a person.

14. The method according to claim 6, wherein said party is a business.

15. A method for providing calendar based call control, comprising:

acquiring a called telephone number for a telephone call originating from a calling telephone;

providing said acquired telephone number to a telephony application, said telephony application acquiring call control data from a calendar;

receiving call control data from said telephony application;

routing said telephone call originating from said calling telephone based on said received call control data wherein said call control data is formatted as XML data.

16. The method according to claim 15, wherein said call control data is a call rejection data.

17. A method for providing calendar based call control, comprising:

formatting data fields of a calendar entry in an XML format, said data fields containing call control data; and communicating said XML formatted call control data to a telephony interface based on a call request, said telephony interface causing said XML formatted data to control handling of a telephony call feature.

18. A machine readable storage having stored thereon, a computer program having a plurality of code sections, said code sections executable by a machine for causing the machine to perform the steps of:

defining an markup language element having a user defined tag representing a calendar entry having call control information, said defining step for providing calendar based call control; and representing data fields in the calendar entry as attributes within said markup language, said attributes having user defined tags, said attributes representing a call control instruction.

19. The machine readable storage according to claim 18, further comprising providing said call control instruction to a telephony application in response to initiation of a call.

20. The machine readable storage according to claim 19, wherein the said calendar entry is stored in a database, said database comprising a calendar application program for maintaining said database.

21. The machine readable storage according to claim 20, wherein said database is accessible by a telephony call control application.

22. The machine readable storage according to claim 18, wherein said markup language element is an XML formatted element.

23. A machine readable storage having stored thereon, a computer program having a plurality of code sections, said code sections executable by a machine for causing the machine to perform the steps of:

acquiring a called telephone number and a calling telephone number from a telephone network device for an associated telephone call, said acquiring step for providing calendar based call control;

determining an identity of a party affiliated with said called telephone number;

extracting call control information from a markup language element having a user defined tag, said element representing a calendar entry associated with said identified party; and controlling a call based on said extracted call control information.

24. The machine readable storage according to claim 23, wherein said extracting step further comprises:

parsing said calendar entry to determine a particular call control data in said entries;

comparing said determined call control data with said calling telephone number; and instructing said telephone network device to route said call to said called number in response to a match resulting from said comparison.

25. The machine readable storage according to claim 24, further comprising, instructing said telephone network device to cancel said call to said called number in response to no match resulting from said comparison.

26. The machine readable storage according to claim 25, further comprising, providing an aural notification pertaining to a call status.

27. The machine readable storage according to claim 26, wherein said call control data is a call rejection instruction.

28. The machine readable storage according to claim 24, wherein said telephone network device is a signaling device.

29. The machine readable storage according to claim 24, wherein said telephone network device is a switch.

30. The machine readable storage according to claim 23, wherein said party is a person.

31. The machine readable storage according to claim 23, wherein said party is a business.

32. A machine readable storage having stored thereon, a computer program having a plurality of code sections, said code sections executable by a machine for causing the machine to perform the steps of:

acquiring a called telephone number for a telephone call originating from a calling telephone, said acquiring step for providing an calendar based call control;

providing said acquired telephone number to a telephony application, said telephony application acquiring call control data from a calendar;

receiving call control data from said telephony application;

routing said telephone call originating from said calling telephone based on said received call control data wherein said call control data is formatted as XML data.

33. The machine readable storage according to claim 32, wherein said call control data is a call rejection data.

34. A machine readable storage having stored thereon, a computer program having a plurality of code sections, said code sections executable by a machine for causing the machine to perform the steps of:

formatting data fields of a calendar entry in an XML format, said data fields containing call control data, said formatting step for providing calendar based call control; and communicating said XML formatted call control data to a telephony interface based on a call request, said telephony interface causing said XML formatted data to control handling of a telephony call feature.

* * * * *